Patented May 21, 1935

2,002,063

UNITED STATES PATENT OFFICE 2,002,063

MANUFACTURE OF FIBROIN SOLUTIONS

Wilhelm Irion and Herbert Mahn, Dessau-in-Anhalt, Germany, assignors to I. G. Farbenindustrie Aktiengesellschaft, Frankfort-on-the-Main, Germany No Drawing. Application February 2, 1932, Serial No. 590,507. In Germany February 2, 1931

7 Claims. (Cl. 134—1)

Our present invention relates to the manufacture of fibroin solutions.

One of its objects is to provide a process of concentrating aqueous fibroin solutions. Further objects will be seen from the detailed specification following hereafter.

In the preparation of aqueous solutions of silk fibroin, fit for spinning, it is sometimes necessary to concentrate dilute solutions. This operation is often impaired by the partial or even complete separation of the fibroin, with formation of a skin, similar to the formation of skin on hot milk.

For instance, when fibroin is dispersed in a sodium thiocyanate solution as described in our copending application Ser. No. 531,850 filed April 21, 1931 and the solution obtained is dialyzed until it contains less than 4 per cent. of salt, and the dialyzed solution is concentrated, a skin is readily formed, particularly when the silk wastes have been subjected to a mild pre-treatment in the degumming operation and the like.

According to our invention the said separation of the fibroin is avoided by adding to the solution a small quantity of bile or a bile-acid, gallic acid amide, lecithin, an alkali salt of a hydroxy-, chloro- or amino-benzoic acid, or a wetting agent, for instance, an alkali salt of the substituted naphthalin sulfonic acids, or an alkali salt of the sulfonated textile oils, such as Turkey red oil, or the like, in short by adding a substance known to have the effect of reducing surface tension.

Furthermore, the addition of such a substance allows omission of a special pre-treatment, except a careful degumming, of the silk wastes, before dissolving them, so that a degradation of the parent material is avoided. It also has the advantage that there are no jelly-like structures and agglomerations to be removed from the solution, that filtration is facilitated, and that the resistance of the silk to rubbing and to shearing is increased.

The following examples illustrate the invention:

Example 1.—An aqueous solution containing 4 per cent. of fibroin and 0.2 per cent. of sodium thiocyanate is mixed with 0.01 per cent. of desoxycholic acid and concentrated in a rotating drum, while it is heated to 30° C. to 40° C. and air is passed over it, to a fibroin content of 18 to 20 per cent.

Example 2.—An aqueous solution of fibroin containing about 4 per cent. of fibroin and about 0.2 per cent. of sodium rhodanate is mixed with about 0.05 per cent. of ox gall in a rotating drum. This mixture is heated at about 30° to 40° C. and concentrated to a content of about 18 to 20 per cent. of fibroin while passing air over the solution.

Example 3.—The conditions are the same as in Example 2 with the exception that the ox gall is replaced by 0.02 per cent. of cholic acid.

Example 4.—An aqueous solution of fibroin containing about 6 per cent. of fibroin and about 0.4 to 0.5 per cent. of sodium rhodanate is mixed with about 0.01 per cent. of desoxycholic acid in a rotating drum. This mixture is heated at about 30 to 40° C. and concentrated to a content of about 18 to 20 per cent. of fibroin.

Example 5.—To an aqueous solution of fibroin containing about 4 to 5 per cent. of fibroin and about 0.4 to 0.5 per cent. of sodium rhodanate there are added about 1.5 per cent. of sodium salicylate. This solution can be concentrated under the conditions of the preceding examples to a content of about 15 to 20 per cent. of fibroin without the formation of a skin.

Example 6.—The conditions are the same as in Example 5 with the exception that the sodium salicylate is replaced by 1 per cent. of the sodium salt of isopropylnaphthalene sulfonic acid.

Our invention is not limited to the foregoing examples. The concentration of the dilute aqueous fibroin solutions may be carried out in any known manner. The temperature used in the concentrating operation may vary within wide limits, it is, however, preferably not raised above 40° C. in order to be sure that the fibroin molecule is degraded as little as possible.

What we claim is:

1. In the manufacture of aqueous fibroin solutions the steps which comprise adding to the dilute fibroin solution a compound having the capacity of reducing the surface tension of this solution and subjecting the mixture to a concentrating operation.

2. In the manufacture of aqueous fibroin solutions the steps which comprise adding to the dilute fibroin solution a compound having the capacity of reducing the surface tension of this solution and subjecting the mixture to a concentrating operation at a temperature of at most 40° C.

3. In the manufacture of aqueous fibroin solutions the steps which comprise adding to an aqueous solution of fibroin containing about 6 per cent. of fibroin and about 0.4 to 0.5 per cent. of sodium rhodanate, about 0.01 per cent. of desoxycholic acid in a rotating drum, and concentrating this solution to a content of about 18 to 20 per cent. of fibroin by heating the said solution to about 30° to 40° C. while passing air over it.

4. In the manufacture of aqueous fibroin solutions the steps which comprise adding to an aqueous solution of fibroin containing about 4 per cent. of fibroin and about 0.2 per cent. of sodium rhodanate, about 0.05 per cent. of ox gall in a rotating drum, and concentrating this solution to a content of about 18 to 20 per cent. of fibroin by heating the said solution to about 30° to 40° C. while passing air over it.

5. In the manufacture of aqueous fibroin solutions the steps which comprise adding to an aqueous solution of fibroin containing about 4 per cent. of fibroin and about 0.2 per cent. of sodium rhodanate, about 0.02 per cent. of cholic acid in a rotating drum, and concentrating this solution to a content of about 18 to 20 per cent. of fibroin by heating the said solution to about 30° to 40° C. while passing air over it.

6. In the manufacture of aqueous fibroin solutions the steps which comprise adding to the dilute fibroin solution a surface tension-reducing agent which is inert to the fibroin and is an organic compound containing an acidic radical, the agent being added in a small amount not materially in excess of about 2%, and subjecting the mixture to a concentrating operation at a temperature below the temperature of material degradation of the fibroin.

7. In the manufacture of aqueous fibroin solutions the steps which comprise adding to the dilute fibroin solution a surface tension-reducing agent which is inert to the fibroin and is an organic compound containing an acidic radical, the agent being added in a small amount not materially in excess of about 2%, and subjecting the mixture to a concentrating operation at a temperature of at most 40° C.

WILHELM IRION.
HERBERT MAHN.